US007908386B2

(12) United States Patent
Gotare et al.

(10) Patent No.: US 7,908,386 B2
(45) Date of Patent: Mar. 15, 2011

(54) LARGE SCALE MOBILE NETWORK ADDRESS TRANSLATION

(75) Inventors: Christian Gotare, Getinge (SE); Johan Kölhi, Vaxholm (SE); Tomas Thyni, Norsborg (SE)

(73) Assignee: Telefonaktiebolaget L M Ericsson Publ), Stockholm (SE)

( * ) Notice: Subject to any disclaimer, the term of this patent is extended or adjusted under 35 U.S.C. 154(b) by 0 days.

(21) Appl. No.: 12/594,723

(22) PCT Filed: Apr. 4, 2007

(86) PCT No.: PCT/IB2007/000884
§ 371 (c)(1),
(2), (4) Date: Oct. 5, 2009

(87) PCT Pub. No.: WO2008/122828
PCT Pub. Date: Oct. 16, 2008

(65) Prior Publication Data
US 2010/0121985 A1    May 13, 2010

(51) Int. Cl.
*G06F 15/16* (2006.01)
*H04L 12/28* (2006.01)

(52) U.S. Cl. ............ 709/227; 370/401; 726/15
(58) Field of Classification Search ............ 709/223, 709/224, 227; 370/331, 401, 464, 465; 455/436–444; 726/12, 14, 15
See application file for complete search history.

(56) References Cited

U.S. PATENT DOCUMENTS
6,954,790 B2 * 10/2005 Forslow ............ 709/227
* cited by examiner

*Primary Examiner* — Yemane Mesfin
(74) *Attorney, Agent, or Firm* — Roger S. Burleigh

(57) ABSTRACT

A method and system for enabling a mobile station (MS) to transfer from one Network Address Translation (NAT) domain to another NAT domain. Dynamic rules created in the first NAT domain are transferred to the second NAT domain via a first Media Policy Routing function. A tunnel is created between the second NAT domain and the first MPR for transferring a MS session. A new session from the MS is created outside the tunnel and once the MS session times out, the MS session, the states existing in the first MPR and the second NAT domain utilizing a new set of dynamic NAT rules created in the second NAT domain are all removed. The tunnel is then removed and communication via a second MPR and the second NAT domain is available.

12 Claims, 7 Drawing Sheets

LARGE SCALE MOBILE NETWORK ADDRESS TRANSLATION

TECHNICAL FIELD

The present invention relates to address transfer between Network Address Translation domains. More particularly, and not by way of limitation, the present invention is directed to a system and method for transferring active sessions between NAT domains.

BACKGROUND

Existing access technologies do not support mobility in combination with Network Address Translation (NAT) and session continuity without specialized client software. With increasing numbers of non 3GPP access solutions, especially radio based solutions in the form of WiFi and WiMAX, there is a limitation in mobility functions.

Existing solutions for these limitations normally requires special client software, such as Mobile IP client or similar which puts extra demand on mobile terminals. In order to support many different types of terminals, there is a need to keep terminal requirements to a minimum.

With existing methods there is a larger overhead with tunnels needed from the terminals and the existing methods typically create problems with traffic flows to tunnel termination points in the network. The existing solutions may also cause problems with spoofing filters in routers.

It would be advantageous to have a system and method for providing full mobility for a mobile client that overcomes the disadvantages of the prior art. The present invention provides such a system and method.

SUMMARY OF THE INVENTION

Mobility and session continuity are created without special demands on 30 clients, while keeping the advantages of NAT and IPv4. A combination of NAT rule transfer and tunneling techniques are used when a mobile station (e.g., a laptop computer) begins a session in a first network address translation (NAT) domain and dynamic NAT rules are created for the MS session. The MS moves from the first NAT to a second NAT domain and the dynamic rules created in the first NAT domain are transferred to the second NAT domain via a first Correspondent Node that contains a Media Policy Routing function (MPR).

Session state routes are created in a first MPR activating the dynamic NAT 5 rules in the second NAT domain that were created in the first NAT domain. The first NAT domain releases the transferred dynamic NAT rules and creates a tunnel between the second NAT domain and the first MPR for transferring the MS session traffic between the second NAT domain and the first MPR. Whenever a new session is created from the MS the new session is created outside the tunnel 10 utilizing a new set of dynamic NAT rules created in the second NAT domain. Active sessions continue to be transferred between the second NAT domain and the first MPR via the tunnel. When the sessions in the tunnel are either timed out or terminated, the tunnel between the second NAT domain and the first MPR is removed.

Thus, in one aspect, the present invention is directed to a method in a communications network wherein a mobile station (MS) begins a session in a first Network Address Translation (NAT) domain and dynamic NAT rules are created for the session. The MS moves from the first NAT domain to a second NAT domain and the dynamic NAT rules created in the first NAT domain are transferred to the second NAT domain via a first Media Policy Routing (MPR) function.

The dynamic NAT rules, created in the first NAT domain, are activated in the second NAT domain and a tunnel is created between the second NAT domain and the first MPR for transferring the MS session traffic between the second NAT domain and the first MPR. When the MS begins operating in the second NAT domain, a new set of dynamic NAT rules is created in the second NAT domain for active sessions initiated in the second NAT domain. Concurrently, the active sessions initiated in the first NAT domain are continuing to be transferred between the second NAT domain and the first MPR via the tunnel.

When all the session that were using the tunnel are terminated, the tunnel between the second NAT domain and the first MPR is removed.

In another aspect, the present invention is directed to a system for transferring active sessions between a first and second Network Address Translation domain. The system includes means for creating an active session with a mobile station (MS) in the first NAT domain associated with a first node and dynamic NAT rules are created for the session in the first node. A second node, in communication with the first node and the second NAT domain, includes a Media Policy Routing function As the MS moved into the second NAT domain, there is means for transferring the dynamic NAT rules, created for the session in the first NAT domain, to the second NAT domain. The transferred dynamic NAT rules are activated in the second NAT domain and a tunnel is created between the second NAT domain and the MPR in the second node for transferring MS session traffic.

A new set of dynamic NAT rules is created for active sessions created in the second NAT domain, wherein the active sessions created in the first NAT domain are continuing to be transferred between the second NAT domain and the first MPR via the tunnel and when all the transferred session are terminated the tunnel is removed.

BRIEF DESCRIPTION OF THE DRAWINGS

In the following section, the invention will be described with reference to exemplary embodiments illustrated in the figures, in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the present invention each access network uses traditional Network Address Translation (NAT), where dynamic NAT rules are created on a session by session basis. A method is disclosed for moving mobile IP NAT rules between access domains while keeping active sessions running. A set of routing and tunneling techniques being combined with distributed NAT functions is also described.

Figure 1:
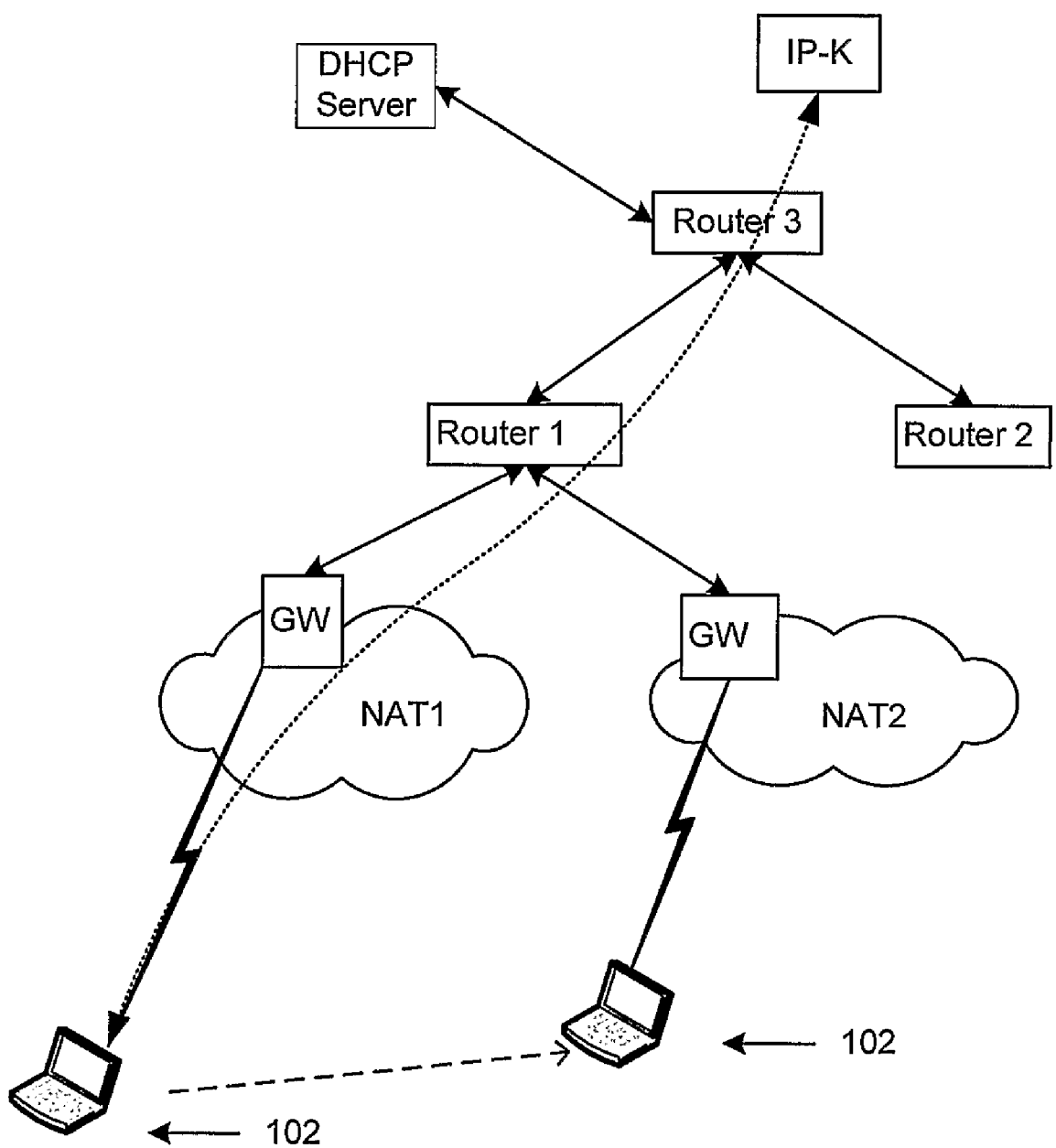
FIG. 1 depicts a high level block diagram of a network in which a mobile station is shown moving between two Network Address Translation areas.

FIG. 1 depicts a high-level, simplified block diagram of a mobile station (e.g., laptop computer) beginning a session inside a Network Address Translation domain. Gateway 1 (GW1) assigns a private Internet Protocol (IP) address to the MS via the Dynamic Host Configuration Protocol (DHCP). A dynamic NAT state is created when the MS establishes a session. Communication between the MS is established between the MS and a target address via the Gateway (GW1), Router 1 and Router 3.

GW1 binds the inside IP address of the MS (IP-Y) with TCP or UDP port-y to the outside public address IP-A with the TCP or UDP port (port-A) to the device and port (IP-K, port-k) that IP-Y the MS is attempting to communicate with.

Currently, in the event the MS moves from the first NAT domain to another NAT domain, all active sessions break and the MS must go through new private IP address assignment via DHCP from the new local GW (and this process usually requires manual user intervention). As illustrated, the communication pathway is broken down and the MS must reestablish connection after entering the second NAT domain.

Figure 2:
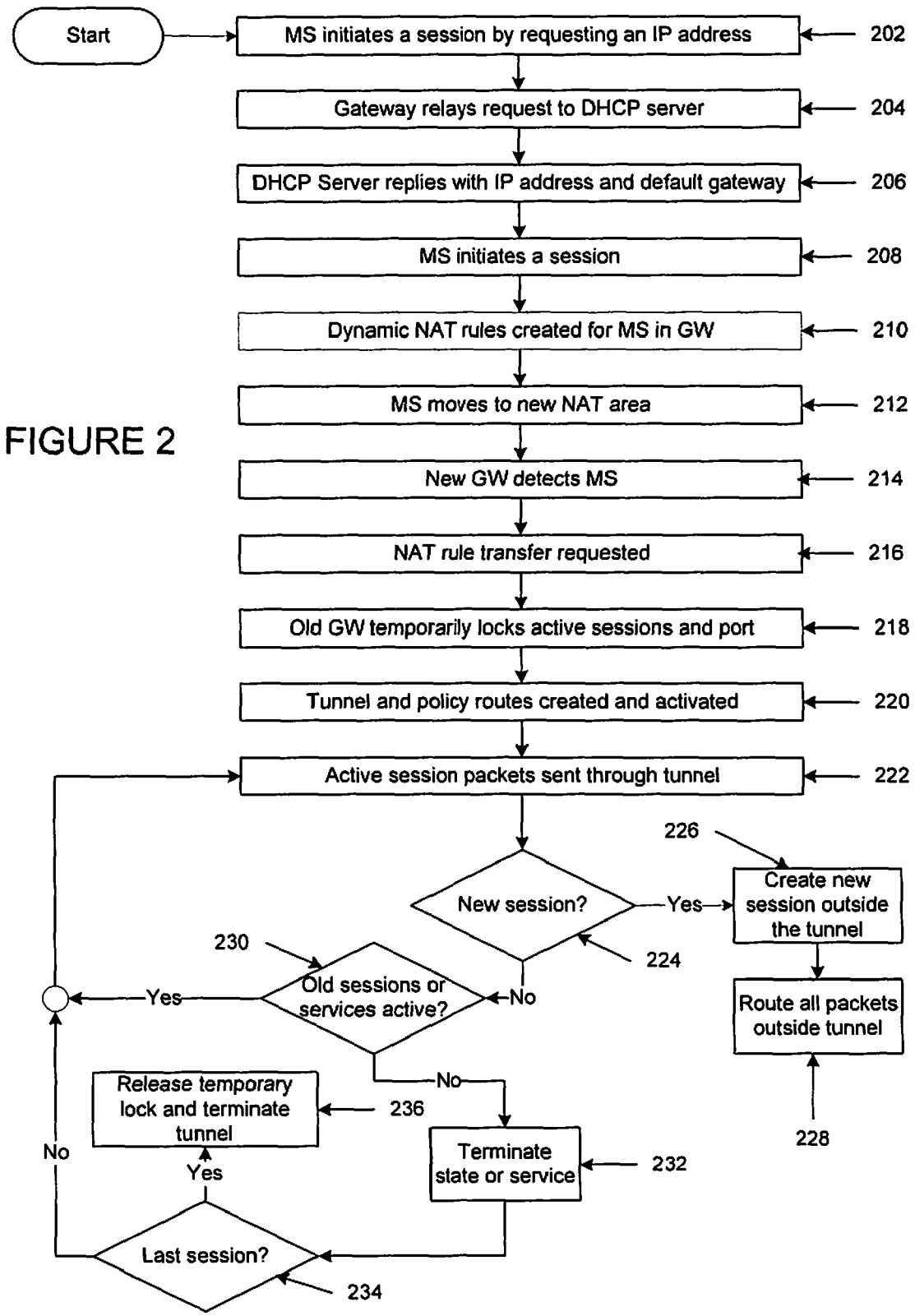
FIG. 2 illustrates a high-level flow diagram of a process in accordance with an embodiment of the present invention.

FIG. 2 illustrates a high-level flow diagram of a mobile station transferring between a first Network Address Translation (NAT) domain and a second NAT domain in accordance with an embodiment of the present invention. The process begins with a laptop computer (MS) initiating a session by requesting an IP address (step 202). The gateway associated with the first NAT relays the address request to DHCP (Dynamic Host Configuration Protocol) server (step 204). The DHCP server replies with an assigned IP address and default gateway (step 206). The MS initiates the session (step 208).

Dynamic NAT rules are then created for the MS in the gateway (step 210) and the MS moves to the second NAT domain (step 212). The gateway associated with the second NAT domain detects the MS (step 214) and requests NAT rule transfer from the first gateway (step 216).

The old gateway temporarily locks active sessions to the MS and the port (step 218) after which CN2 activates the MPR function in the router associated with both the old and the new gateway and creates and activates a tunnel and policy routes between the new gateway and the router (step 220). Active sessions are now sent through the tunnel (step 222).

As the MS begins operation in the new NAT domain, there will be new sessions. A determination (step 224) is made whether a new session is initiated with the MS in the new NAT domain. If there is a new session started, this new session is created outside the tunnel (step 226). All the packets related to any new sessions are routed outside the tunnel between the new NAT domain and the router (step 228).

If there are one or more sessions active, the active session packets are continuing to be sent through the established tunnel (step 222 and 230). If an old session is no longer active, CN2 terminates the state or service (step 232) and a determination is made whether this is the last session that is utilizing the tunnel (step 234). CN2 tells CN1 to release the temporary lock when a session terminates, CN2 then tells MPR to remove the policy route associated with the session and if this is the last session in the tunnel, CN2 tells the MPR function in the router to terminate the tunnel (step 236).

At this point the tunnel is no longer connected to the second NAT domain and all the packet communications are flowing between the second NAT domain and the router.

Figure 3A:
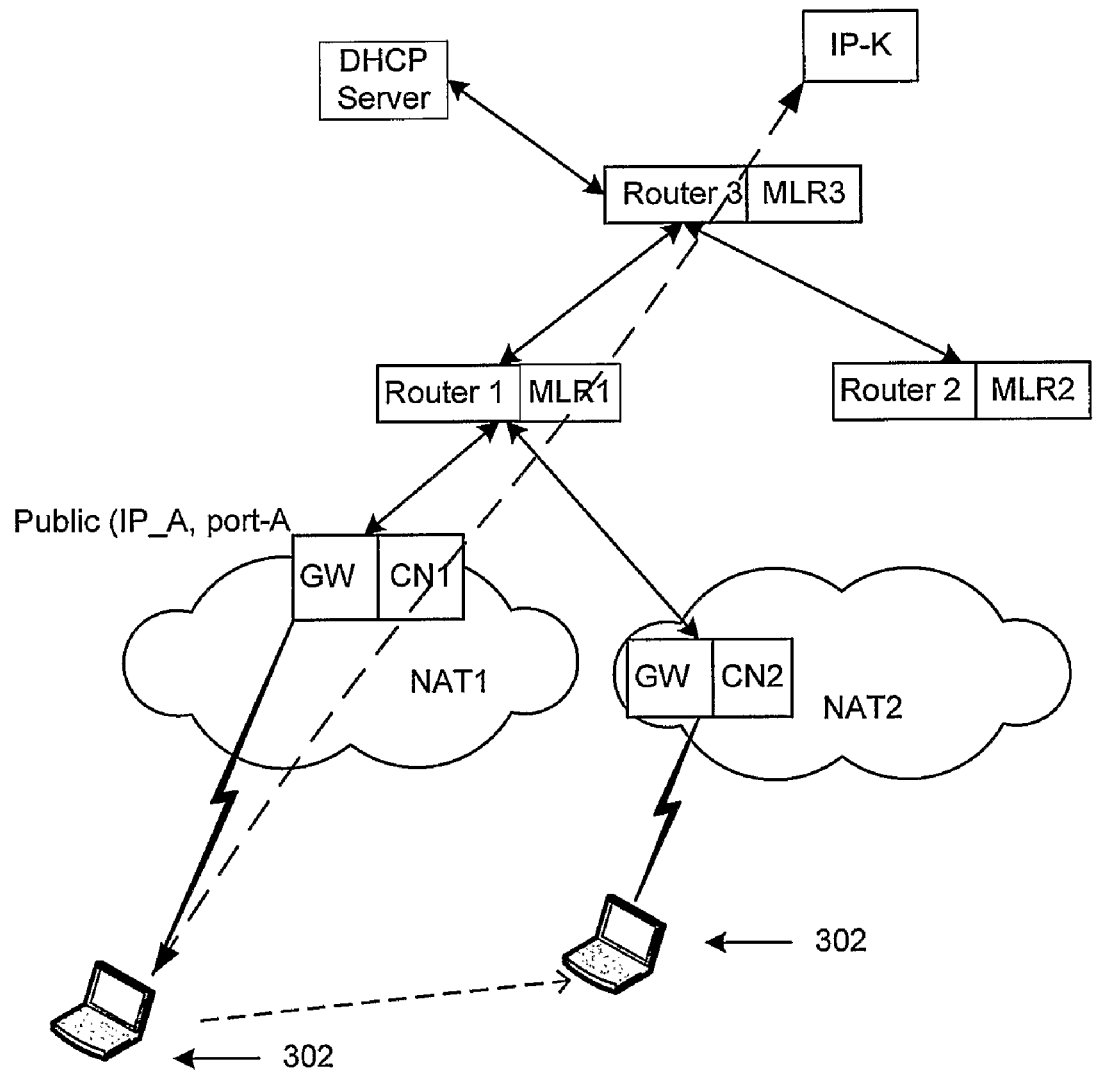
FIG. 3a depicts a first in a series of configurations of a high-level block diagram of a MS in transition between a first NAT and a second NAT in accordance with an embodiment of the present invention.

FIGS. 3a, 3b, 3c and 3d illustrate the stages through which the communication setup passes in accordance with an embodiment of the present invention. FIG. 3a depicts a laptop (MS) (302) initiating an IP session within a first NAT (NAT1). Dynamic NAT states are created in NAT1 when MS (302) establishes a session, via Correspondent Node 1 CN1 and MPR1, between the CN1's own inside assigned IP address (IP-Y port-Y) with a target IP address (IP-K, port-K). CN1 binds the inside IP address (IP-Y) with TCP or UDP port-Y to the outside public address IP-A with the TCP or UDP port (port-A) to the device and port (IP-K, port-k) that IP-Y is attempting to communicate with. This is not limited to TCP and UDP, other similar protocols can be used as well.

MPR1 is a tunneling and policy routing function in Router 1 and may be implemented in a Correspondent Node, a router forwarding traffic to the CN node or in any node where traffic for a CN node passes.

Figure 3B:
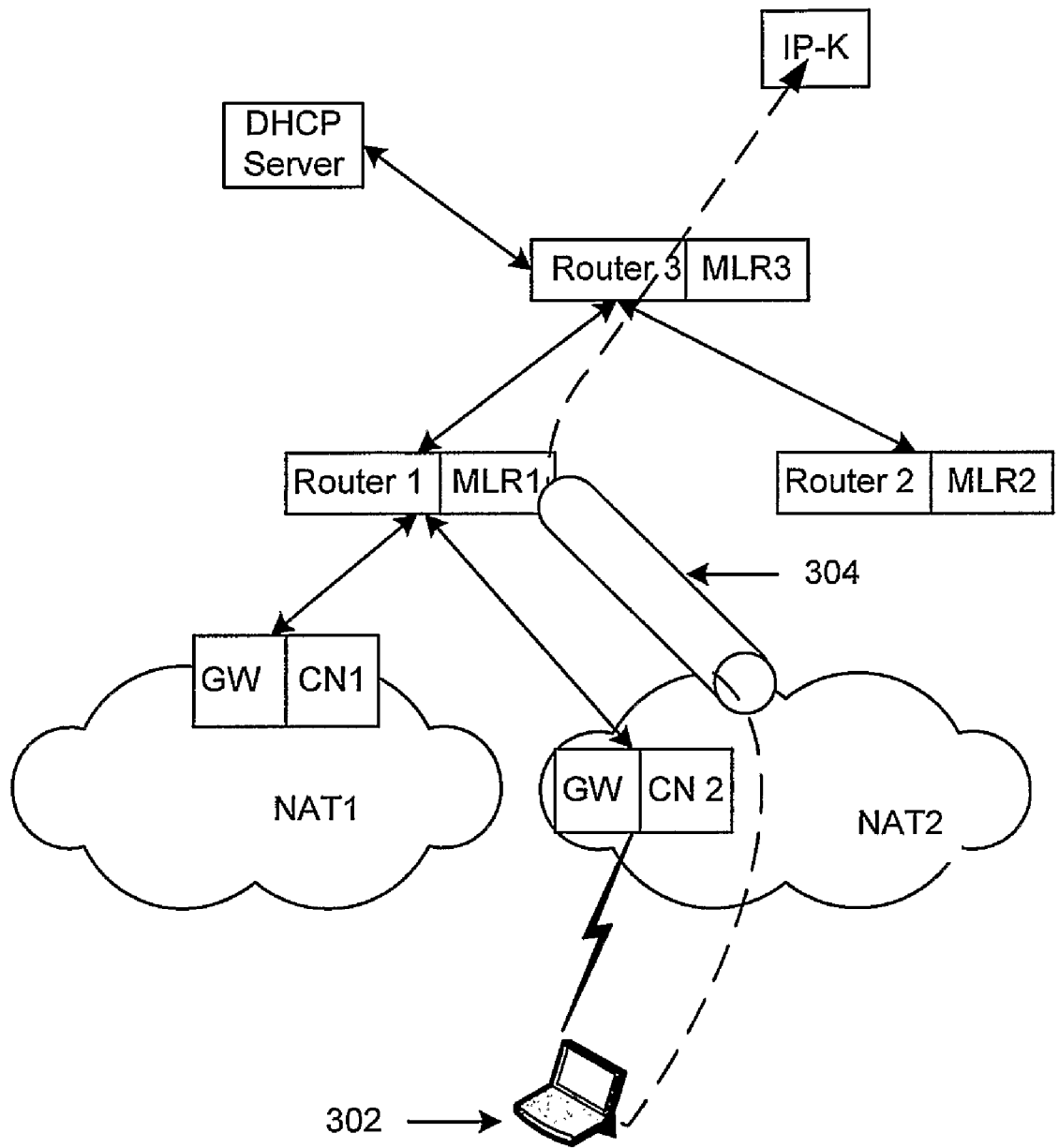
FIG. 3b depicts the second in the series of the configurations of the high-level block diagram of a MS in transition between a first NAT and a second NAT in accordance with an embodiment of the present invention.

As illustrated in FIG. 3b, Correspondent Node 2 (CN2) detects the presence of MS 302 in the NAT2 domain and requests information on DHCP client and previous domain (communication between DHCP server and CN2 not shown). After determining the previous domain of MS 302 is the NAT1 domain, active NAT1 rules that apply to MS 302 are transferred from CN1 to CN2.

MPR2 gets involved if a client outside the control of MPR1 moves into the NAT2 domain. The MPR functions as part of a hierarchy that, theoretically, can be of any size, depending on the needs for each network. It is important to note that DHCP is only used as an example, whereas the use of other protocols and mechanisms that accomplish the same end are possible.

CN2 establishes tunnel 304 to for the active sessions that accompanied MS 302 from NAT1 to NAT2 (IP-y port-y to IP-K port-K). Session state policy routes are created for the active session in the MS, in MPR1. At this point, the MS active sessions that have been transferred from NAT1 to NAT2 are now being tunneled from NAT2 to MPR1 and vice versa for this session's returning traffic. The MS 302 location is updated in the DHCP server or corresponding location database (path not shown) by the CN2.

Figure 3C:
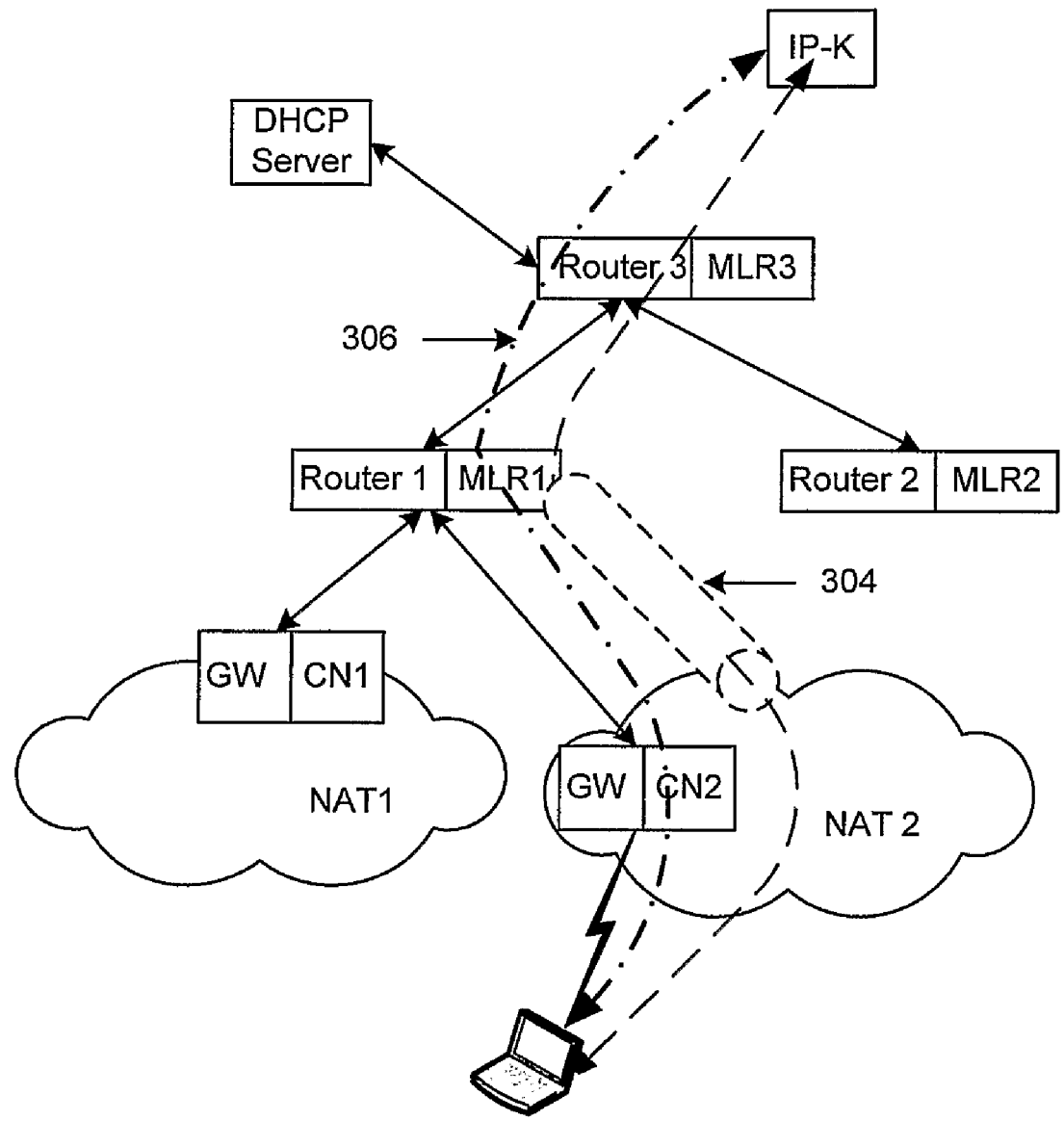
FIG. 3c depicts the third in the series of the configurations of the high-level block diagram of a MS in transition between a first NAT and a second NAT in accordance with an embodiment of the present invention.
Figure 3D:
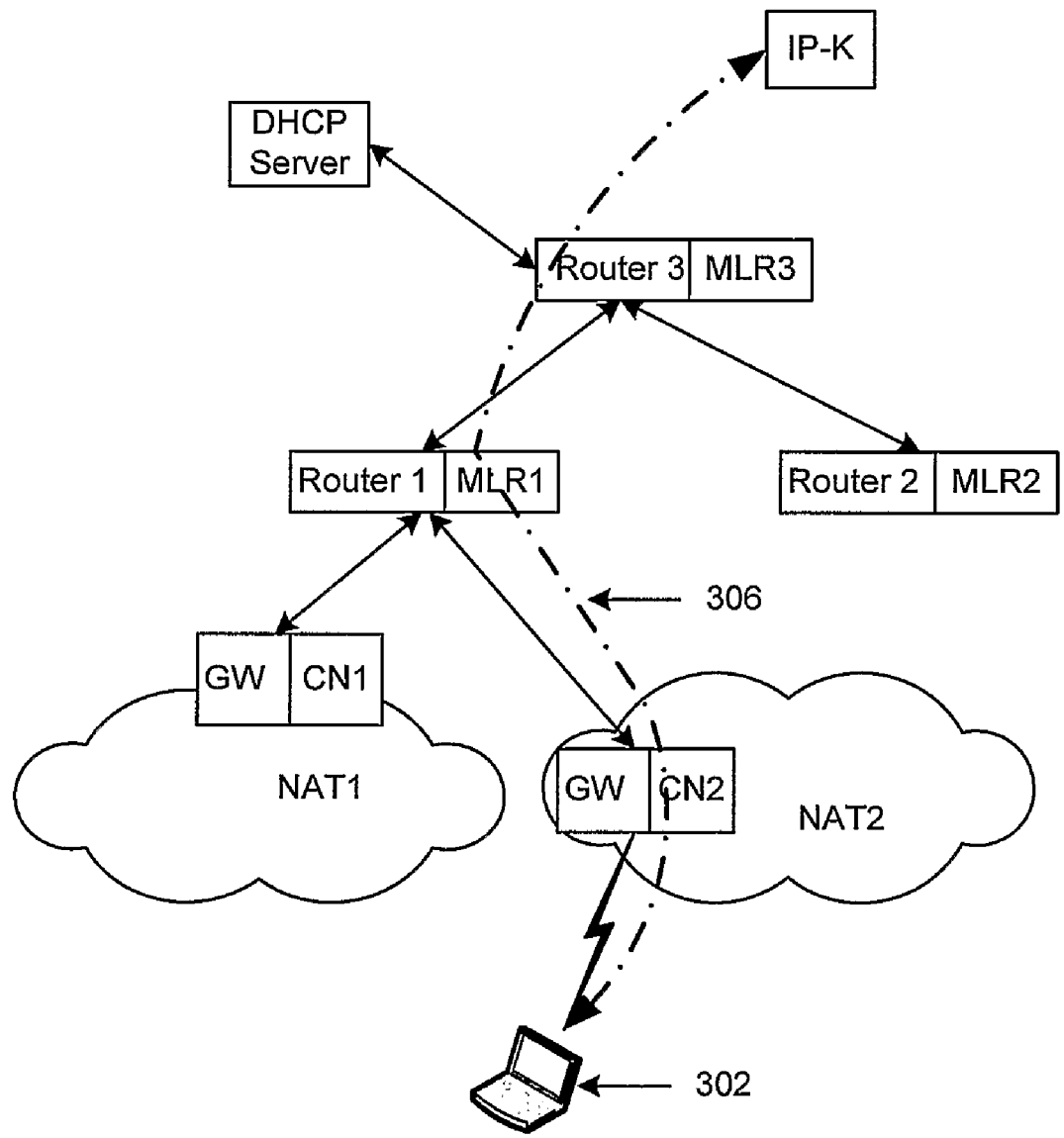
FIG. 3d depicts the fourth in the series of configurations of the high-level block diagram of a MS in transition between a first NAT and a second NAT in accordance with an embodiment of the present invention.

As illustrated in FIG. 3c, in NAT2, MS may begin one or more new active sessions 306 in addition to the transferred and ongoing active sessions. MS 302 creates the new active sessions 306 outside tunnel 304. As all the transferred sessions that were utilizing the tunnel time out or are closed, the tunnel closes. FIG. 3d depicts the IP traffic flow (new active sessions 306) as it now takes place without the tunnel from and to MS 302 via CN2.

Figure 4:
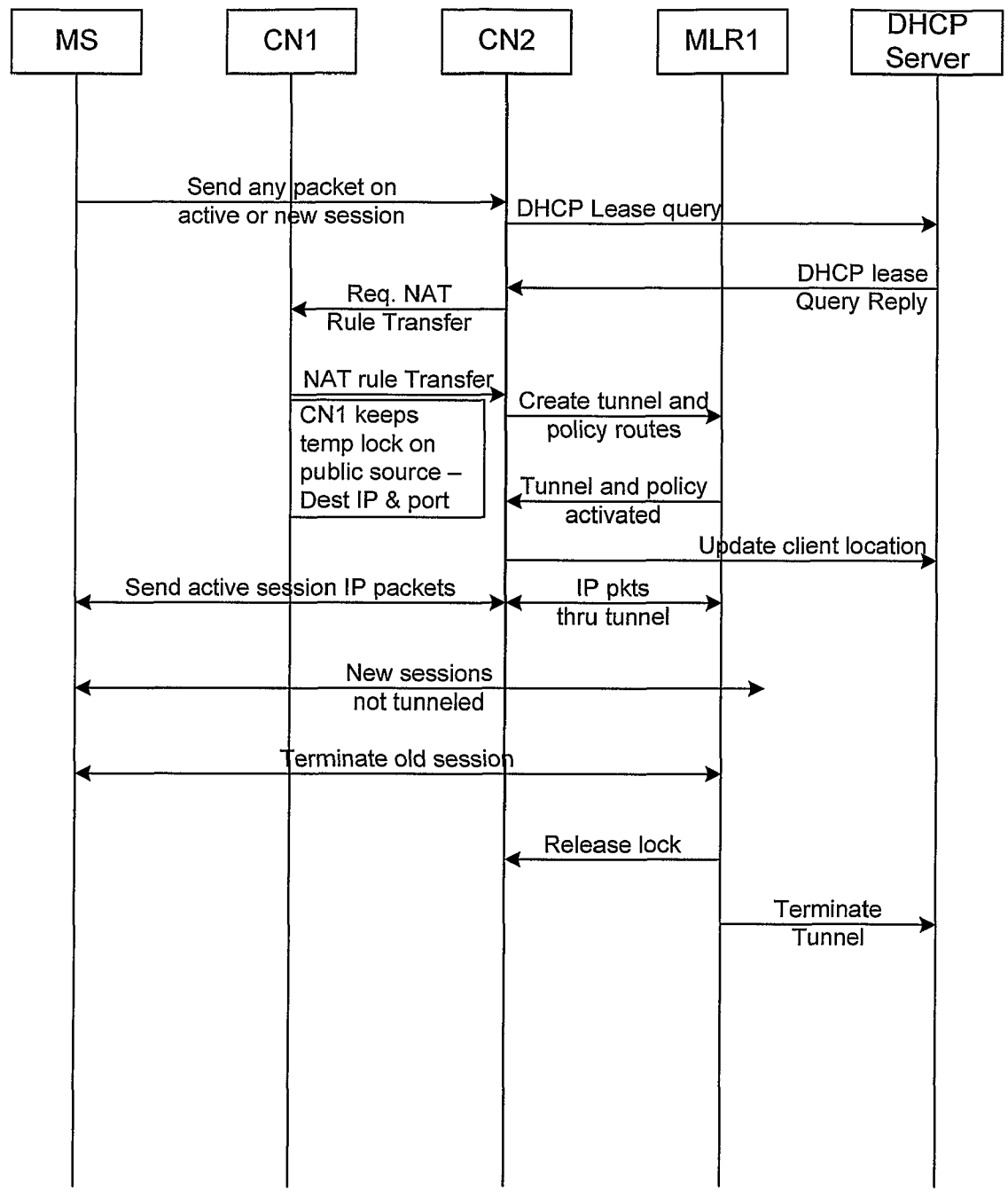
FIG. 4 illustrates a signaling diagram at handover of a Mobile Station from a first NAT to a second NAT in accordance with an embodiment of the present invention.

FIG. 4 illustrates a signaling diagram at handover of a Mobile Station from a first NAT to a second NAT in accordance with an embodiment of the present invention. DHCP Lease is used as one example of an MS tracking mechanism.

This could be any location database protocol in an actual implementation and is not limited to DHCP only. Note that DHCP server could be any server tracking the location, standard or proprietary.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method in a telecommunications network, the method comprising:
    a mobile station (MS) beginning a session in a first Network Address Translation (NAT) domain, wherein dynamic NAT rules are created for the session;
    the MS moving from the first NAT domain to a second NAT domain;
    transferring the dynamic NAT rules created in the first NAT domain to the second NAT domain via a first Media Policy Routing (MPR) function;
    activating the dynamic NAT rules, created in the first NAT domain, in the second NAT domain;
    creating a tunnel between the second NAT domain and the first MPR for transferring the MS session traffic between the second NAT domain and the first MPR;
    utilizing a new set of dynamic NAT rules created in the second NAT domain, wherein the active sessions are continuing to be transferred between the second NAT domain and the first MPR via the tunnel; and
    removing the tunnel between the second NAT domain and the first MPR when all transferred sessions are terminated.

2. The method of claim 1, further comprising the step of creating session state routes for the session in the first MPR.

3. The method of claim 1, further comprising the step of the first NAT domain releasing the dynamic NAT rules that were transferred to the second NAT domain.

4. The method of claim 1, further comprising the step of creating a new session from the MS outside the tunnel in the second NAT domain.

5. The method of claim 1, further comprising the steps of
    determining that the transferred session has timed out or been terminated and removing the transferred session from the tunneled traffic, wherein the states existing in the first MPR and the second NAT domain are also removed.

6. The method of claim 1, wherein the mobile station comprises a mobile computer.

7. A system, in a telecommunications network, for transferring active sessions between nodes, the system comprising:
    means for creating an active session with a mobile station (MS) in a first Network Address Translation (NAT) domain associated with a first node and dynamic NAT rules are created for the session in the first node;
    means for communicating with a second node; wherein said second node is in communication with a second NAT domain and the second node includes a first Media Policy Routing (MPR) function and wherein the MS has moved to the second NAT domain;
    means for transferring the dynamic NAT rules created for the session in the first NAT domain to the second NAT domain;
    means for activating the transferred dynamic NAT rules in the second NAT domain;
    means for creating a tunnel between the second NAT domain the first MPR in the second node for transferring the MS session traffic between the second NAT domain and the first MPR;
    means for utilizing a new set of dynamic NAT rules for active sessions created in the second NAT domain, wherein the active sessions created in the first NAT domain are continuing to be transferred between the second NAT domain and the first MPR via the tunnel; and
    means for removing the tunnel between the second NAT domain and the first MPR when all transferred sessions are terminated.

8. The system of claim 7, further comprising means for creating session state routes for the active session in the first node, in the first MPR.

9. The system of claim 7, further comprising means for enabling the first NAT domain to release the dynamic NAT rules created in the first NAT domain to be transferred to the second NAT domain.

10. The system of claim 7, further comprising means for creating a new session from the MS outside the tunnel in the second NAT domain.

11. The system of claim 7, further comprising the steps of
    determining that a transferred session has timed out or been terminated and
    removing the transferred session from the tunneled traffic, wherein the states existing in the first MPR and the second NAT domain are also removed.

12. The system of claim 1, wherein the MS comprises a mobile computer.

* * * * *

UNITED STATES PATENT AND TRADEMARK OFFICE
CERTIFICATE OF CORRECTION

PATENT NO. : 7,908,386 B2  
APPLICATION NO. : 12/594723  
DATED : March 15, 2011  
INVENTOR(S) : Gotare et al.

Page 1 of 1

It is certified that error appears in the above-identified patent and that said Letters Patent is hereby corrected as shown below:

On the Title Page, in Field (73), under "Assignee", in Column 1, Line 2, delete "Publ)," and insert -- (Publ), --, therefor.

In Column 1, Line 38, after "demands on" delete "30".

In Column 1, Line 49, after "dynamic NAT" delete "5".

In Column 1, Line 55, after "tunnel" delete "10".

In Column 6, Line 47, in Claim 12, delete "system" and insert -- method --, therefor.

Signed and Sealed this  
Twenty-second Day of November, 2011

David J. Kappos  
*Director of the United States Patent and Trademark Office*